April 17, 1951 — G. H. KUHL — 2,549,490
MULTIPLE SPINDLE DRILL GEARING
Filed Nov. 2, 1945 — 2 Sheets-Sheet 2

Inventor:
George H. Kuhl,
By Chritton, Wiles, Schroeder,
Merriam & Hofgren, Attys.

Patented Apr. 17, 1951

2,549,490

UNITED STATES PATENT OFFICE 2,549,490

MULTIPLE SPINDLE DRILL GEARING

George H. Kuhl, Glen Ellyn, Ill., assignor to Jay B. Chamberlain and Louise R. Chamberlain, a partnership, doing business as Commander Mfg. Co., Chicago, Ill.

Application November 2, 1945, Serial No. 626,272

8 Claims. (Cl. 74—665)

1

This invention relates to an improved multiple spindle drill having a low manufacturing cost, great accuracy, and interchangeability, one in which the parts are removable to enable cleaning, repair, oiling and the like, and which is adapted to be quickly, easily, and removably attached to a drill press, and is capable of drilling holes in various adjustable positions, and has a greater range of adjustability and lateral movement of the drills with relation to each other.

Among the objects of the present invention are: to provide a novel and improved multiple spindle drill; to provide a multiple spindle drill having a novel gear casing in which the gears and associated parts may be easily and quickly assembled and disassembled; to provide a novel arrangement of universally adjustable multiple spindles capable of being swung laterally with relation to each other and with a greater range of adjustability and efficiency of operation; to provide a novel combination of housing and gear casing enabling easy assembling and disassembling of parts, and when assembled being of maximum efficiency and convenience in operation; to provide a novel construction and arrangement of locator arms for adjustably locating the positions of the multiple drills with relation to each other with a greater range of effective operation; and to provide a multiple spindle drill head embodying a novel combination of parts and providing greater efficiency and adjustability and adapted to be attached to a drill press.

Other objects and advantages will become more readily apparent from the following detailed description taken in connection with the accompanying drawings.

Figure 1:
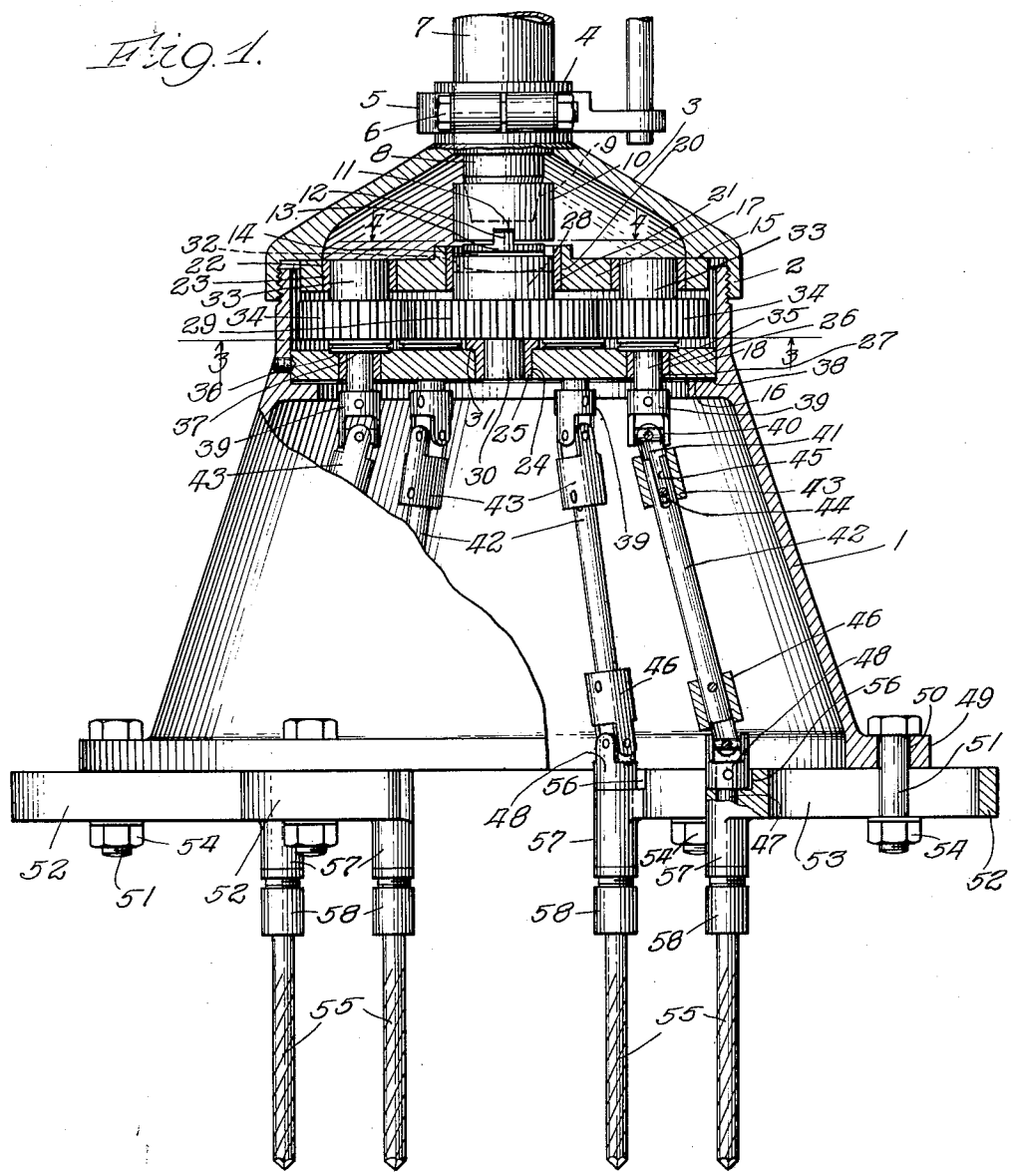
Fig. 1 is a partial side elevation and a partial vertical central section of a multiple spindle drill embodying my invention.
Figure 2:
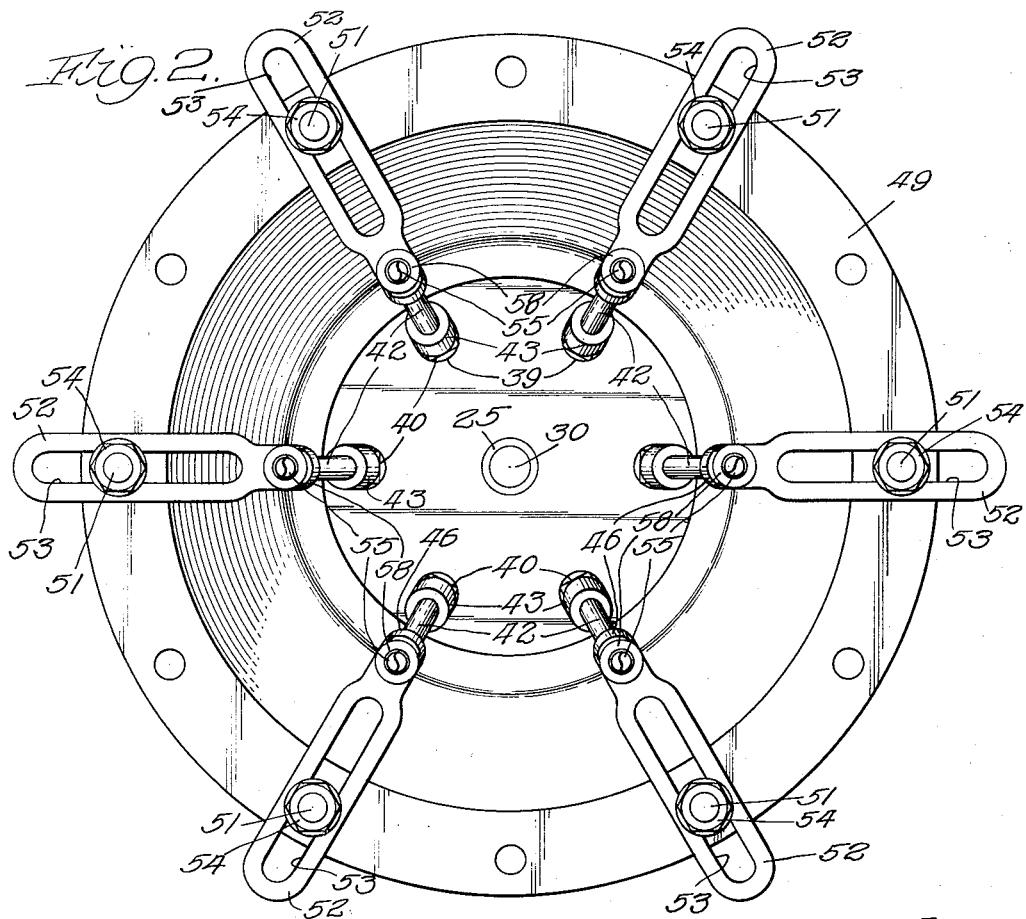
Fig. 2 is a bottom plan view of the multiple spindle drill shown in Fig. 1.

While my invention resides in the combination, construction and arrangement of parts illustrated in the accompanying drawings, I have shown therein for illustrative purposes, a preferred embodiment, and wish it understood that the same is susceptible of modification and change without departing from the spirit and scope of the appended claims.

Referring more in detail to the drawings my improved multiple spindle drill comprises a lower housing 1, removably secured by threads 2 to the upper housing part 3 having an upstanding tubular neck 4 which surrounds the drill 7 of a drill press and is clamped thereto by a clamp ring 5 through the medium of a suitable bolt 6. The drill press spindle is shown at 8. Fixed to the lower tapered end 9 of the spindle 8 to rotate therewith is a driver adapter 10 having in its bottom face a diametrically extending central groove 11 within which is slidably mounted the upper rib 12 of a coupling element 13. This element at its lower side, as viewed in Fig. 1, has a diametrically positioned rib 14 extending at right angles to the upper rib 12.

The upper housing part 3 is formed with an inwardly extending annular seat 15 and the lower housing part 1 is formed with an inwardly extending annular seat 16 spaced a distance below said seat 15. Clamped between seats 15 and 16 is a one piece gear casing (preferably cast in one piece) comprising an upper plate 17 and a lower plate 18, these two plates being integrally held together in spaced apart relation by any suitable number of ribs 19. For convenience I have shown three of such ribs circumferentially spaced apart around the gear casing. These ribs integrally hold the upper and lower plates 17 and 18 together as a unitary whole so that these two plates are rigidly and permanently fastened together as one piece. The upper plate 17 is formed with a central opening 20 within which is fixed a bearing sleeve 21. The upper plate is also formed with a suitable number of circumferentially spaced openings 22 within each of which is fixed a bearing sleeve 23, six of these circumferentially spaced holes being shown. The bottom plate 18 is formed with a central opening 24 within which is fixed a bearing sleeve 25. The bottom plate 18 is also formed with a number of circumferentially spaced holes 26 corresponding to the holes 22 of the top plate, each of holes 26 having fixed therein a bearing sleeve 27.

Figures 3, 4:
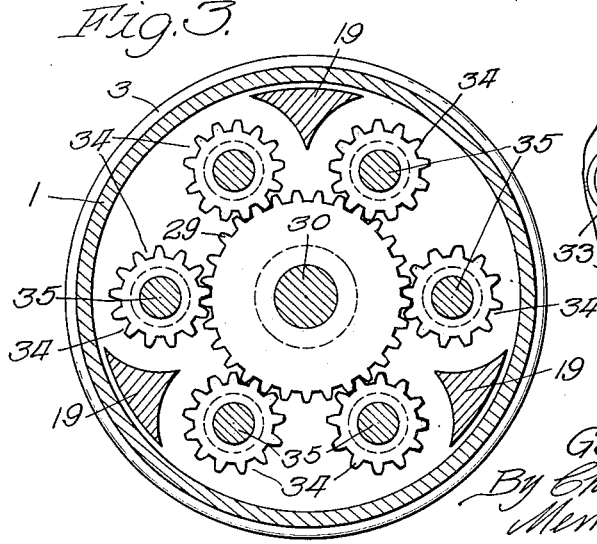
Fig. 3 is a transverse section on the line 3—3 of Fig. 1 looking in the direction of the arrows.
Fig. 4 is a fragmentary top plan view looking downwardly from the plane of line 4—4 of Fig. 1.

As seen in Figs. 1 and 3 the holes 22 in the top plate and the holes 26 in the bottom plate are arranged in pairs, the two holes in each pair being in axial alignment with each other. Rotatably mounted in bearing sleeve 21 in the top plate is a shaft 28 upon which is fixed a gear 29, said shaft 28 passing through this gear and having a lower end 30 projecting downwardly therefrom and rotatably mounted in the bearing sleeve 25. This bearing sleeve has at its upper end an outwardly extending annular flange 31 against which bears the bottom face of gear 29. Shaft 28 at its upper end is formed with a laterally extending diametrical central groove 32 within which slidably fits the bottom rib 14 of the coupling element 13. The sliding engagement of rib 12 in the groove 11 of the driver adapter, and the sliding engagement of rib 14 in the groove 32 in the top of shaft 28 in effect constitutes a universal joint of such nature that shaft 28 and gear 29 will be driven by the spindle regardless of any misalignment between these parts, thus assuring a positive and effective driving action between these parts.

Rotatably mounted in each of the bearing sleeves 23 of the upper plate is a shaft 33 each extending through a gear 34, each of these gears being in engagement with the central gear 29. Each of shafts 33 either before or after passing through gear 34 is reduced in diameter at 35, which reduced portion is rotatably mounted in one of the bearing sleeves 27. The bottom plate 18 around each of the bearing sleeves 27 is formed with a circular depression 36 within each of which depressions is seated a ball bearing unit 37 upon the upper side of which ball bearing unit rests the gearing 34. It will be understood that the construction of each of gears 34 and their shafts and associated parts for mounting them between the upper and lower plates of the gear casing is the same for each of the six gears 34 shown. With this construction it is seen that I have provided a one piece, integral, unitary gear casing having the gears mounted therebetween as described, and which gear casing is clamped between the seats 15 and 16, there preferably being positioned a gasket 38 between the bottom face of the bottom plate 18 and the upper face of the annular seat 16.

Fixed by pins or the like to the lower end of each of the shafts 35 is a sleeve 39 having a pair of oppositely positioned downwardly extending arms 40 which are so connected with a pair of upwardly extending arms 41 as to constitute a universal joint connection between sleeve 39 and the upper end of spindle 42 so that the spindle will be rotated by shaft 35 regardless of its angular position. Fixed to the arms 41 is a sleeve 43 having fixed to extend laterally therethrough a pin 44, there being provided in the upper end of a spindle 42 a longitudinally extending slot 45, this slot having up and down sliding movement with relation to the pin 44 as the spindle 42 is moved laterally to any desired angular position. Fixed by a pin or other suitable means to the bottom end of spindle 42 is a sleeve 46 and fixed to the top end of shaft 47 is a complemental sleeve 48, these two sleeves being connected together by complemental pivotally connected arms similar to those described above in connection with arms 40 and 41 to form a universal joint between the bottom end of spindle 42 and shaft 47. As will be understood there is provided a similar spindle and similar connecting universal joint at the top and bottom thereof for each of the six gears 34 and shafts 35.

Formed upon the lower end of the bottom housing part 1 is an annular outwardly extending flange 49 having around its perimeter a number of openings 50 to receive bolts 51. The number of such holes is preferably greater than the number of spindles and drills used in these parts so as to obtain flexibility. Positioned below each of holes 50 is a locator arm 52 having a longitudinally extending slot 53 large enough to be longitudinally slidable over the bolt 51.

When the locator arm has been positioned to the desired position of adjustment, nut 54 will be tightened to rigidly hold the locator arm in such adjusted position. When the nut 54 is loosened locator arm 52 may be swung in either direction desired and at the same time slid longitudinally along bolt 51, thus affording a wide variety of positions to which the drills 55 may be moved. It is to be understood that there will be one locator arm for each drill thus affording the flexible adjustability referred to above for each and all of the drills.

Each of the locator arms will at their inner end be preferably formed with a recess 56 which permits the mounting for holding and driving the drill, and the universal joint just above the same, to be positioned at a lower level than would be the case were such drill mounting positioned on the top surface of the locator arm. By providing this recess and dropping these parts a corresponding distance I have increased the lateral range of adjustability of the spindles and drills by decreasing the angle as compared with what the angle would be if these parts were mounted at the top level of the locator arm. This in addition to giving a greater range of adjustability shortens the height necessary for the bottom housing part 1. Formed upon the inner end of each of the locator arms is a downwardly extending neck 57 having a vertical opening therethrough to receive the rotating parts for driving the drills. Each drill is suitably clamped in a chuck 58.

The multiple spindle drill head described above is designed primarily for attachment to a drill press, but as will be understood it may be built into a new machine or otherwise applied in any other connection to which it may be adapted. The gear casing shown and described herein is such that all the bores in the top and bottom plates may be drilled simultaneously in a single mounting in a suitable fixture, thus assuring accurate alignment of the co-axial bores for each shaft. In assembling the device the gears may be pushed into place laterally in the space between the top and bottom plates, their respective shafts inserted through the holes of the gears and into their final positions. When desired they may be removed by reverse operations for inspection, oiling, repairs, cleaning and the like. It is also to be noted that easy access is afforded for the gear casing by merely unscrewing the top body part 3 from the bottom part 1 by rotation in the proper direction of the interengaging screw threads 2, which will render the gear casing and its gears instantly available. By reverse operation the gear casing and its gears may be returned into operative position in the housing and be made quickly ready for further operation. The slot 45 affords automatic lengthening or shortening of the spindles 42 as the drills 55 are being swung into various angular positions of the spindle.

An important feature of my invention is that the holes 22 in the upper plate 17 of the one piece gear casing and the holes 26 in the lower plate 18 thereof, are arranged in pairs and the top and bottom holes of each pair are drilled simultaneously by a unitary drilling fixture so that the holes of each pair will be in perfect coaxial alignment. This is also true of the upper and lower holes 20 and 24. Also the upper and lower bearing sleeves of each of these pairs of holes are pressed in simultaneously on a single arbor in a press. As will be understood this gives perfect alignment for these parts, and it is never necessary to destroy such alignment to get at the parts within the gear casing for inspection, oiling or repairs.

From the foregoing it will be seen that I have provided a multiple spindle drill having a novel gear casing which permits of rapid and accurate machining and avoids the necessity for separately and precisely machining and fitting mating parts and in which the gears and associated parts may be easily and quickly assembled and disassembled. This one piece construction provides permanent alignment of the bearings in which the shafts rotate at high speeds, thus materially lengthening the useful life of said parts.

I claim:

1. A multiple spindle drill, comprising, a one-piece gear casing having spaced apart top and bottom plates each formed with a central opening in axial alignment with the central opening in the other, each of said plates also having a plurality of circularly arranged holes spaced radially outwardly from the central opening, each of the circularly arranged holes in each plate being in axial alignment with a corresponding hole in the other plate, whereby shafts may be mounted in said central opening and said circularly arranged holes to mount rotatable gears in the space between said plates, a lower housing having an inwardly extending annular seat provided around its outer edge with an upwardly extending wall enclosing said gear casing, an upper housing having an inwardly extending annular seat provided around the outer edge with a downwardly extending wall, and means for removably securing said walls together and clamping the gear casing between said seats.

2. A multiple spindle drill, comprising, a one-piece gear casing having spaced apart top and bottom plates each formed with a central opening in axial alignment with the central opening in the other, each of said plates also having a plurality of circularly arranged holes spaced radially outwardly from the central opening, each of the circularly arranged holes in each plate being in axial alignment with a corresponding hole in the other plate, a shaft mounted in the central openings, and a shaft mounted in each pair of the axial aligned circularly arranged holes, a gear on the central shaft, and a gear on each of the other shafts meshing with the central gear to be driven thereby for driving the multiple spindles of the drill, a lower housing having an inwardly extending seat and an upwardly extending wall member surrounding said gear casing, an upper housing having an inwardly extending seat, said gear casing being positioned between said seats, and means for removably clamping the gear casing firmly between said seats.

3. A multiple spindle drill, comprising, a one-piece gear casing having spaced apart top and bottom plates each formed with a central opening in axial alignment with the central opening in the other, each of said plates also having a plurality of circularly arranged holes spaced radially outwardly from the central opening, each of the circularly arranged holes in each plate being in axial alignment with a corresponding hole in the other plate, a shaft mounted in the central openings, and a shaft mounted in each pair of the axial aligned circularly arranged holes, a gear on the central shaft, and a gear on each of the other shafts meshing with the central gear to be driven thereby for driving the multiple spindles of the drill, and a universal coupling member operatively mounted at the upper end of the central shaft adapted to connect the same with the driving spindle of a drill press, said gear casing having its top and bottom plates spaced apart by circumferentially spaced ribs with openings therebetween, a bottom housing and a top housing between which said gear casing is clamped, and a wall on said housings outside of said gear casing and enclosing the same.

4. A multiple spindle drill adapted to be driven from a drill press driving spindle, comprising a one-piece gear casing having spaced apart plates, a central shaft rotatably mounted in said plates, a gear on said central shaft and positioned in the space between said plates, a plurality of circularly arranged shafts in said plates outside of the central shaft, a gear on each of the circularly arranged shafts and positioned in the space between said plates to mesh with the central gear, said gear casing having its top and bottom plates spaced apart by circumferentially spaced ribs with openings therebetween, a bottom housing and a top housing between which said gear casing is clamped, and a wall on said housings outside of said gear casing and enclosing the same.

5. A multiple spindle drill adapted to be driven from a drill press driving spindle, comprising a one-piece gear casing having spaced apart plates, a central shaft rotatably mounted in said plates, a gear on said central shaft and positioned in the space between said plates, a plurality of circularly arranged shafts in said plates outside of the central shaft, a gear on each of the circularly arranged shafts and positioned in the space between said plates to mesh with the central gear, said spaced apart plates being spaced apart by circumferentially spaced ribs with slots therebetween, a bottom housing having an inwardly extending annular seat provided on its outer edge with an upstanding wall member, a top housing having an inwardly extending annular seat provided on its outer edge with a downwardly extending wall member, and means for drawing said wall members together to clamp said gear casing between said seats, said wall members being outside of said gear casing and forming an enclosure therefor.

6. A multiple spindle drill adapted to be driven from a drill press driving spindle, comprising a one-piece gear casing having spaced apart plates, a central shaft rotatably mounted in said plates, a gear on said central shaft and positioned in the space between said plates, a plurality of circularly arranged shafts in said plates outside of the central shaft, a gear on each of the circularly arranged shafts and positioned in the space between said plates to mesh with the central gear, a universal coupling member connecting one end of the central shaft to be rotated by the drill press driving spindle, and spacing ribs between said plates for holding them apart, said spacing ribs being circumferentially spaced apart to form openings therebetween, a bottom housing having an inwardly extending seat, and a top housing having an inwardly extending seat, and a wall connecting said housings outside of the gear casing and enclosing the same.

7. In a multiple spindle drill, a gear casing formed of a pair of parallel plates spaced apart to form a space therebetween and integrally connected together to form a unitary one-piece casing, gears rotatably mounted in said plates and positioned in said space, said gear casing having open slots around its peripheral edge for insertion and removal of said gears, a lower housing having an inwardly extending seat upon which the gear casing is adapted to seat, an upper housing having an inwardly extending seat adapted to be seated upon the top edge of said gear casing, and a wall member connecting said top and bottom housings, said wall member being outside of said gear casing and forming an enclosure therefor.

8. In a multiple spindle drill, a housing having separable parts, a gear casing formed of a pair of parallel plates spaced apart to form a space therebetween, gears in said space, and means on said housing parts for clamping the gear casing in the housing and also enabling removal of the gear casing and gears from the housing as a unit when desired, said means comprising a lower housing part having an inwardly extending seat and an upwardly extending wall portion surrounding the gear casing, an upper housing part having an inwardly extending seat, and interengageable threads on the lower and upper housing parts for clamping the gear casing between said seats.

GEORGE H. KUHL.

REFERENCES CITED

The following references are of record in the file of this patent:

UNITED STATES PATENTS

| Number | Name | Date |
|---|---|---|
| 845,103 | Ljungstrom | Feb. 26, 1907 |
| 1,061,343 | Wayte | May 13, 1913 |
| 1,097,678 | Scott | May 26, 1914 |
| 1,112,730 | Trivers et al. | Oct. 6, 1914 |
| 1,361,160 | Kavle | Dec. 7, 1920 |
| 1,444,343 | Goodwin | Feb. 6, 1923 |
| 1,721,612 | Yannes | July 23, 1929 |
| 1,799,393 | Rylander | Apr. 7, 1931 |
| 1,799,740 | Felton | Apr. 7, 1931 |
| 1,903,074 | Weymouth | Mar. 28, 1933 |
| 1,935,715 | Hunt et al. | Nov. 21, 1933 |
| 2,222,613 | Green | Nov. 26, 1940 |